(12) United States Patent
Pegrum et al.

(10) Patent No.: US 7,342,874 B2
(45) Date of Patent: Mar. 11, 2008

(54) HIGH-AVAILABILITY PACKET FORWARDING APPARATUS AND METHOD

(75) Inventors: Scott S. Pegrum, Nepean (CA);
Matthew M. Yuen, Ottawa (CA);
Nabila Ould-Brahim, Kanata (CA);
Gregory A. Wilbur, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 953 days.

(21) Appl. No.: 10/449,112

(22) Filed: Jun. 2, 2003

(65) Prior Publication Data

US 2003/0198182 A1 Oct. 23, 2003

Related U.S. Application Data

(63) Continuation-in-part of application No. 10/025,496, filed on Dec. 26, 2001, now Pat. No. 7,206,309.

(60) Provisional application No. 60/279,099, filed on Mar. 27, 2001.

(51) Int. Cl.
*G06F 11/00* (2006.01)
*G01R 31/08* (2006.01)
*G08C 15/00* (2006.01)
*H04L 1/00* (2006.01)
*H04L 12/26* (2006.01)

(52) U.S. Cl. .................... 370/218; 370/244; 714/1
(58) Field of Classification Search ........ 370/216–218, 370/241, 242, 244, 422; 714/1, 25, 47
See application file for complete search history.

(56) References Cited

U.S. PATENT DOCUMENTS

| H1814 H | * | 11/1999 | Browning et al. ........ 379/242 |
| 6,088,328 A | | 7/2000 | McKnight ................. 370/216 |
| 2002/0089980 A1 | | 7/2002 | Rombeaut et al. ........ 370/389 |
| 2002/0103921 A1 | * | 8/2002 | Nair et al. ................. 709/232 |
| 2006/0020694 A1 | * | 1/2006 | Nag et al. ................. 709/223 |

FOREIGN PATENT DOCUMENTS

EP 0 747 833 12/1996

OTHER PUBLICATIONS

*The Avici SSR™ Stackable Switch Router*, online product brochure downloaded on Dec. 19, 2001 from the web site of Avici Systems Inc., http://www.avici.com.

* cited by examiner

Primary Examiner—Kevin C. Harper
(74) Attorney, Agent, or Firm—Kent Daniels; Ogilvy Renault

(57) ABSTRACT

Failover protection is provided on the same facilities for a network connection passing through a high-availability router having shared resources managed by two control processors that respectively maintain a forwarding information bases (FIB). The two processors run asynchronously in a master/standby relationship. Integrity of processes running on the control processors is monitored and a forwarding engine forwards packets according to a FIB maintained by an in-service one of the control processors. If one of the control processors fails, the other control processor uses the same bandwidth on the same facility to continue forwarding packets for a network connection. Identifiers in each packet associated with the network connection are used to indicate the reserved bandwidth associated with the network connection.

6 Claims, 5 Drawing Sheets

HIGH-AVAILABILITY PACKET FORWARDING APPARATUS AND METHOD

CROSS-REFERENCE TO RELATED APPLICATIONS

This application is a continuation-in-part of application Ser. No. 10/025,496 filed Dec. 26, 2001, which issued to U.S. Pat. No. 7,206,309 on Apr. 17, 2007, and which claims the benefit under Title 35 United States Code §119 of United States Provisional Application No. 60/279,099 filed on Mar. 27, 2001.

TECHNICAL FIELD

The present invention relates in general to routers and packet forwarding engines and, in particular, to a method an apparatus for providing failover protection for a network connection supported by a facility connected to a high-availability router.

BACKGROUND OF THE INVENTION

Existing router architectures and routing protocols lack certain desirable features. For the purposes of this discussion, router architectures and routing protocols include bridging spanning tree protocols (STPs) as well as routing protocols such as Open Shortest Path First (OSPF) and BGP-4 (Border Gateway Protocol version 4).

OSPF is a link-state routing protocol. It is designed to be run internally of a single Autonomous System (AS). Each OSPF router maintains an identical database describing the AS's topology. From this database, a routing table is calculated by constructing a shortest-path tree. OSPF recalculates routes quickly in response to topological changes, utilizing a minimum of routing protocol traffic. OSPF provides support for equal-cost multipath. An area routing capability is also provided, enabling an additional level of routing protection and a reduction in routing protocol traffic. In addition, all OSPF routing protocol exchanges are authenticated.

BGP-4 is an inter-Autonomous System routing protocol. The primary function of a BGP-4 enabled system is to exchange network reachability information with other BGP-4 systems. The network reachability information includes information about a list of ASs that reachability information traverses. The reliability information is sufficient to construct a graph of AS connectivity from which routing loops may be pruned and certain policy decisions at the AS level may be enforced. BGP-4 also provides a new set of mechanisms for supporting classless inter-domain routing. These mechanisms include support for advertising an Internet Protocol (IP) prefix and eliminates the concept of network class within BGP. BGP-4 also introduces mechanisms that allow aggregation of routes, including aggregation of AS paths. To characterize the set of policy decisions that can be enforced using BGP, one must focus on the rule that a BGP-4 speaker advertises to its peers (other BGP-4 speakers with which it communicates) in neighboring ASs only those routes that it uses itself. This rule reflects the "hop-by-hop" routing paradigm generally used throughout the current Internet.

It should be noted that some policies cannot be enforced by the "hop-by-hop" routing paradigm, and thus require methods such as source routing. For example, BGP-4 does not enable one AS to send traffic to a neighboring AS with the intention that the traffic take a different route from that taken by traffic originating in the neighboring AS. On the other hand, BGP-4 can support any policy conforming to the "hop-by-hop" routing paradigm. Since the current Internet only uses the "hop-by-hop" routing paradigm, and since BGP-4 can support any policy that conforms to that paradigm, BGP-4 is highly applicable as an inter-AS routing protocol for the current Internet.

L3 (layer 3 of the open system interconnection model) routing and bridging protocols were not designed to easily allow dual or synchronous standby architectures within routing switches to provide high-availability. Typically, high-availability for packet forwarding equipment is achieved through physical duplication of switches. Physical duplication has a high cost due to increased footprint, ongoing management, and cabling costs. It is therefore advantageous to be able to provide a highly reliable and available solution to minimize these costs. Furthermore, physical duplication generally fails to address the most common point of failure in modern packet forwarding equipment, namely software crashes due to errors in program code. Due to the increasing complexity and feature support in modern packet forwarding software, it is difficult to provide software loads that are completely error free. Current packet forwarding systems, however, fail to adequately address detection and failover for software faults.

High-availability for packet forwarding requires a number of features, including: 1) the ability to perform hitless software upgrades; 2) the ability to provide hitless control path failover due to either software or hardware faults; 3) the ability to provide hitless line card failover; 4) the ability to provide hitless path failover, and 5) other features, including synchronization of Routing/Bridging states using database synchronization, which is difficult to provide due to the large amount of state information required to maintain synchronization. Currently, packet forwarding technology does not support hitless software upgrade or failover, much less the other desirable features listed above.

As is known in the art, there exist a number of methods for providing fault protection for packet network paths. Packet network routing has developed to support improved reliability for data delivery, providing for special, expedient, handling of identifiable packets using such protocols as multi-path label switching (MPLS). With these developments have also come tools for providing fault protection for these delivery techniques. A wide variety of fault protection schemes are available using label switched paths (LSPs) established using label distribution protocol (LDP), or resource reservation protocol (RSVP), for example. A common protection scheme requires setting up primary and backup LSPs by reserving bandwidth for each label switched path on the same or separate links. To provide continuation of MPLS network connections during a failover, the backup LSPs are reserved for the network connection. MPLS tags, in particular traffic-engineered outer tags, may be used for identifying packets for a separate systematic routing procedure. While it is known to protect against equipment failures using a backup LSP to support a network connection, this is an expensive option that ties up considerable network resources.

It therefore remains highly desirable to provide a means of achieving a high level of packet forwarding availability at a reasonable cost and complexity.

SUMMARY OF THE INVENTION

It is therefore an object of the invention to provide a protection scheme for protecting against failure of one control processor in a high-availability router, without duplication of bandwidth reservation.

The invention therefore provides a method for providing failover protection for a connection through a high-availability router. When the connection is established, routed interfaces are created for both a primary and a backup control processor (CP). The routed interfaces are mastered by respective CPs, so that both of the routed interfaces are not mastered by the same CP. The CP that masters the primary interface requests bandwidth from the bandwidth manager for the primary interface on a link to the next router in the network path, such as a label switched path (LSP). This same reserved bandwidth is associated with the backup interface.

In order to facilitate failover, and to associate the backup interface with the reserved bandwidth, an identifier of the connection is included in packets that are sent over the network path. In the event of a failover, a packet forwarding engine of a service termination card receiving the packets will be switched to access only the forwarding information base (FIB) of the CP that is active. The identifier is inserted into packets sent through the connection so that the bandwidth reserved for the connection is used in the event of the failover.

Implementation of a virtual local area network (VLAN) can be used for this purpose, for example. A VLAN is set up over the link(s) that are reserved for the connection, at connection time, as is a backup VLAN that is associated with the FIB associated with the backup interface. Both VLANs are associated with the same reserved bandwidth, and are defined substantially identically. When packets containing the VLAN tags are received at the high-availability router, they are inspected by the packet forwarding engine, which uses them to determine the routed interface associated with the packet, in order to route the data over the reserved bandwidth. If the CP that is master to the primary routed interface is not available, the associated FIB will not be accessible, and the identifier will be read by the packet forwarding engine, that will access the backup FIB to identify the routed interface to be used to forward the packet over the reserved bandwidth associated with the backup VLAN.

The identifier may be stored in any part of the packet inspected by the packet forwarding engine that is suitable for the task, such as, for example in inner tags of an MPLS packet.

The principal advantage of the present invention is that the same bandwidth on the same link is used regardless of whether or not a failover has occurred, so that half of the shared resources are required, while failover protection is assured during software upgrades, and software or hardware failure that is localized to the CP, or parts of STCs, other than the packet forwarding engine.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides an apparatus and method for ensuring high-availability for packet forwarding in a packet network. The apparatus has dual control processors that operate asynchronously in parallel to compute separate forwarding information bases (FIBs) selectively used by service termination cards (STCs) for packet forwarding. During normal operation, the STCs use master control processor FIBs for packet forwarding. If integrity of the master control processor is lost, the STCs switch to the FIBs of the alternate control processor. Control processor integrity is determined by the STCs, which send heartbeat query messages to selected software processes running on each control processor. This ensures rapid detection of software and hardware faults in a control processor to improve availability.

Figure 1:
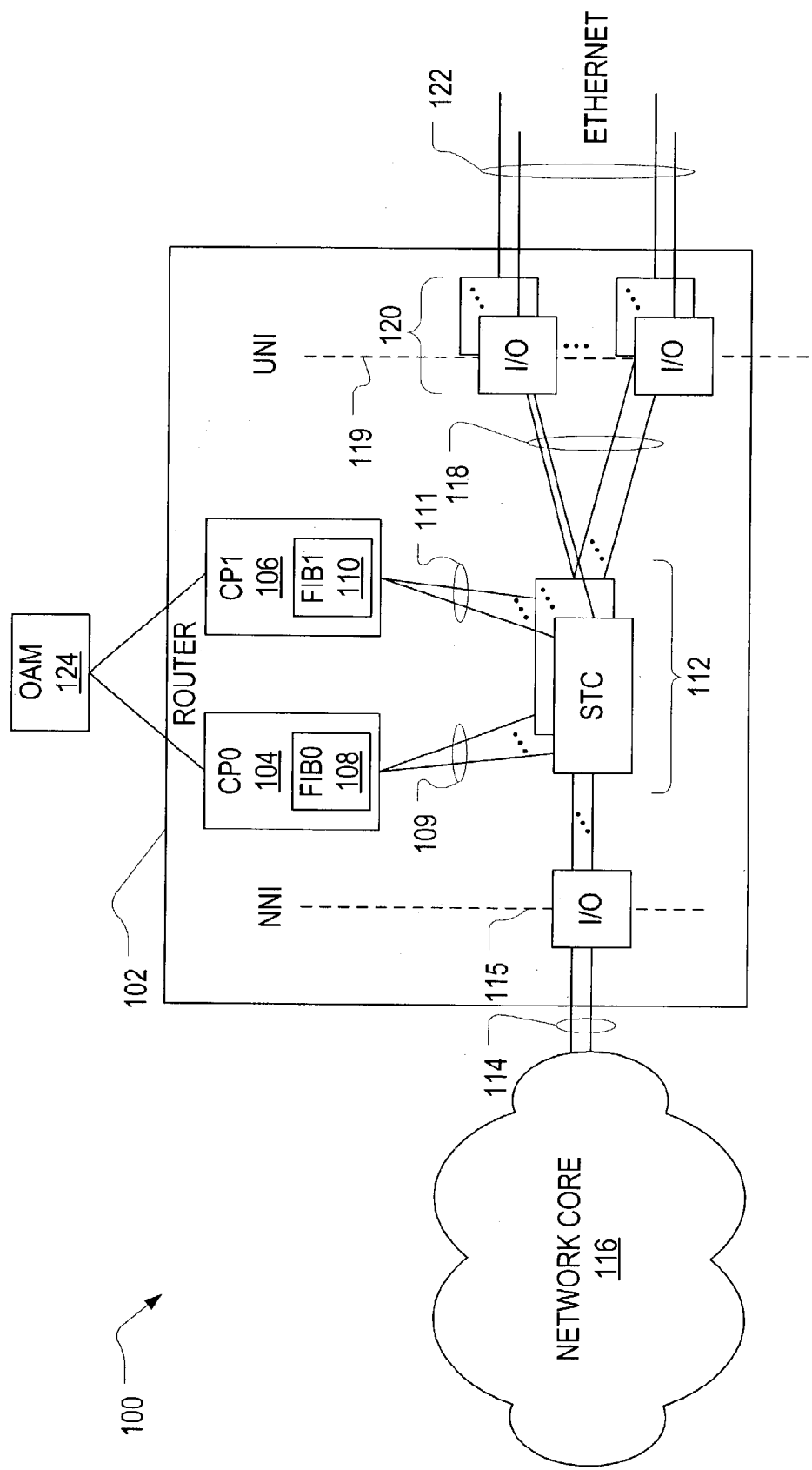
FIG. 1 is a schematic diagram of a computer network including an apparatus in accordance with the invention.

FIG. 1 is a schematic diagram of a computer network 100 that includes a router 102 in accordance with the invention. The router 102 includes a first control processor (CP0) 104 and a second control processor (CP1) 106. Each control processor 104,106 can function as a master, or a standby control processor. Each control processor 104, 106 creates and maintains a respective forwarding information base (FIB0, FIB1) 108,110. Each control processor 104,106 is communicatively connected to one or more service termination cards (STCs) 112 by communications busses 109 and 111, respectively. Each of the STCs 112 is connected by links 114 via an NNI (network to network interface) 115 to a network core 116. The STCs 112 are also connected 118 to a respective I/O interface 120 that each have a respective Ethernet connection 122 available. The control processors 104,106 are both communicatively connected to an operations, administration and management (OAM) workstation 124.

Figure 2:
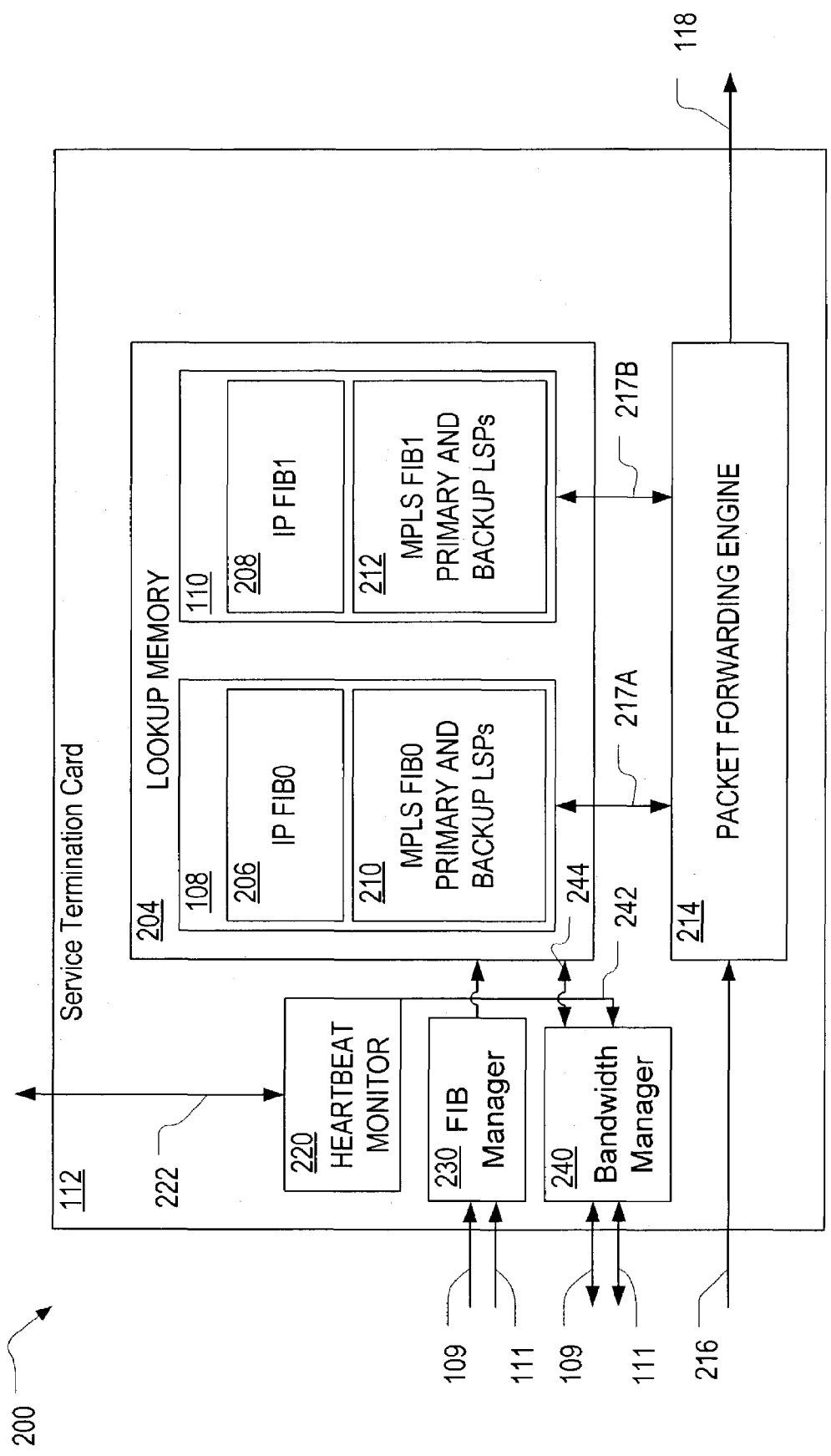
FIG. 2 is a block diagram of a service termination card shown in FIG. 1.
Figure 3:
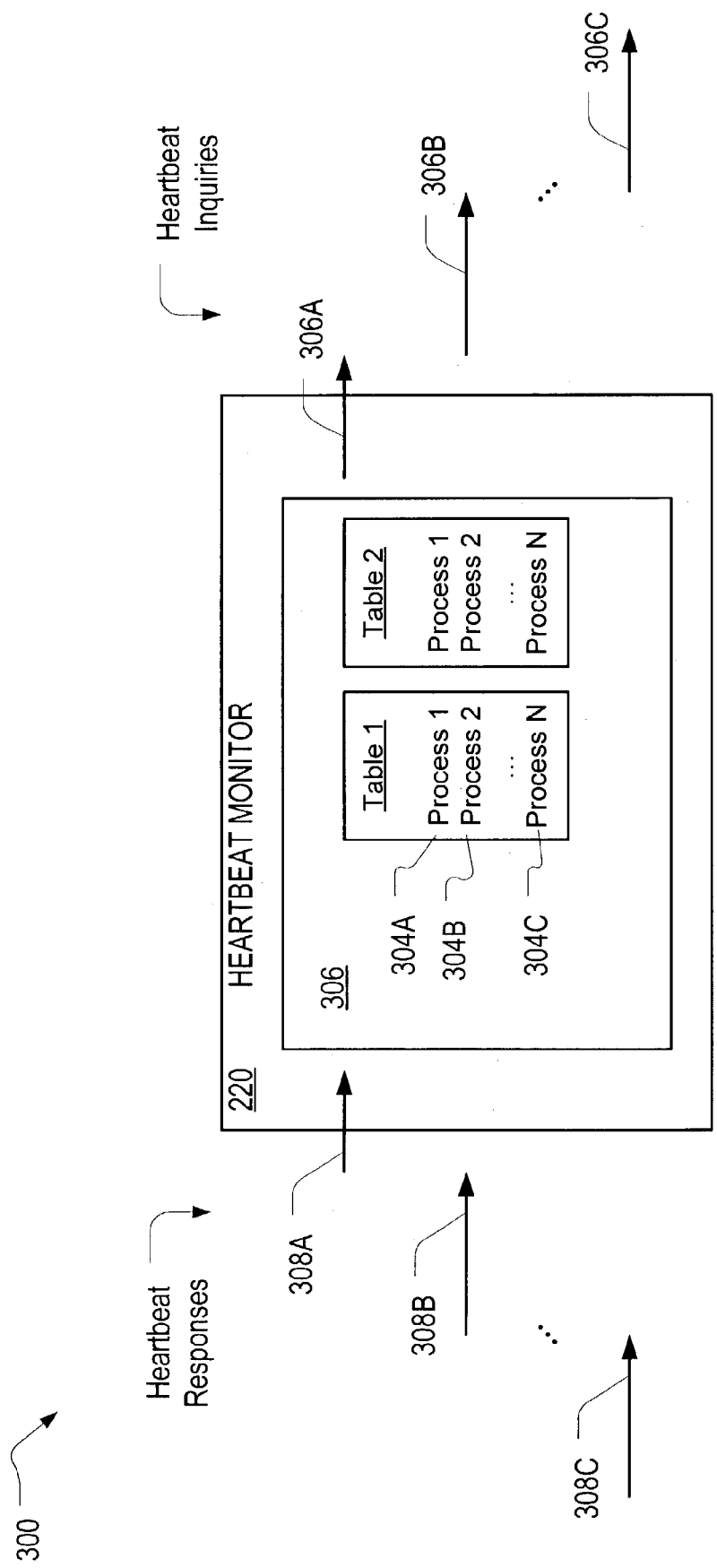
FIG. 3; is a block diagram of a heartbeat monitor shown in FIG. 2.

FIG. 2 is a block diagram 200 of an STC 112 shown in FIG. 1. The STC 112 includes a lookup memory 204 that stores the FIB0 108, which includes an internet protocol forwarding information base (IP FIB0) 206 and a first multi-protocol label switching (MPLS) primary and backup label switched paths (LSPs) (MPLS FIB0) 210. The lookup memory 204 also stores the FIB1 110, which includes an IP FIB1 208 and an MPLS FIB1 212. The STC 112 further includes a packet forwarding engine 214 that is communicatively coupled at 217A to the FIB0 108 and coupled at 217B to the FIB1 110. The STC 112 has a heartbeat monitor 220 communicatively coupled at 222 to the CP0 104 and CP1 106 shown in FIG. 1. The function of the heartbeat monitor 220 will be described below with reference to FIGS. 3 and 4.

Each control processor 104,106 runs all relevant routing protocol applications independently and produces the relevant tables required for packet forwarding. The forwarding information bases (FIB0 108 and FIB1 110) derived from the respective control processors 104,106 are distributed to all STCs 112 regardless of their interface association. It should be noted that the respective FIBs are not necessarily identical, but are expected to contain the same reachability information. The next hop information will most likely not be the same, however. The packet forwarding engine 214 selects a set of FIBs to use at run-time, typically based on control processor association information. In accordance with an embodiment of the invention, a FIB manager 230 receives FIB information form the respective control processors 104,106 via busses 109, 111 and writes the FIB information in the respective FIB0 108 and FIB1 110. The FIB manager 230 is preferably programmed to write the MPLS FIBs so that the primary LSPs of FIB0 are created and maintained by control processor 104, while the backup LSPs of FIB0 are created and maintained by control processor 106. In FIB1, the primary LSPs are created and maintained by control processor 106, while the backup LSPs are written by control processor 104. Consequently, on transit core network traffic, diversely setup LSPs through the control processors 104,106 permit both line and equipment protection to be achieved in a single router 102 in accordance with the invention.

During a control processor reset, or software upgrade that causes a control processor 104,106 to go out-of-service, the STCs 112 are informed in a timely manner and switch to use the set of FIBs of the remaining active control processor. Multicast IP packet services, multi-protocol label switching (MPLS), bridging, and various media related protocols use a hot-standby control processor model. In accordance with one embodiment of the invention, full bandwidth utilization is ensured by a bandwidth manager 240. The bandwidth manager 240 accepts bandwidth allocation requests from the respective control processors 104,106 via busses 109,111. The bandwidth manager allocates bandwidth to the respective control processors 104,106, as required and updates the appropriate FIB information using bus 244 to write to lookup memory 204. However, if one of the control processors is out-of-service, the bandwidth manager is advised of the control processor's condition by the heart beat monitor 224, which sends an appropriate signal over connection 242. On being advised that a control processor is out-of-service, the bandwidth manager releases all bandwidth allocated to the out-of-service control processor, so that it is available to the in-service control processor, which can allocate the bandwidth as required. This permits more efficient failover engineering in the core networks.

Figure 4:
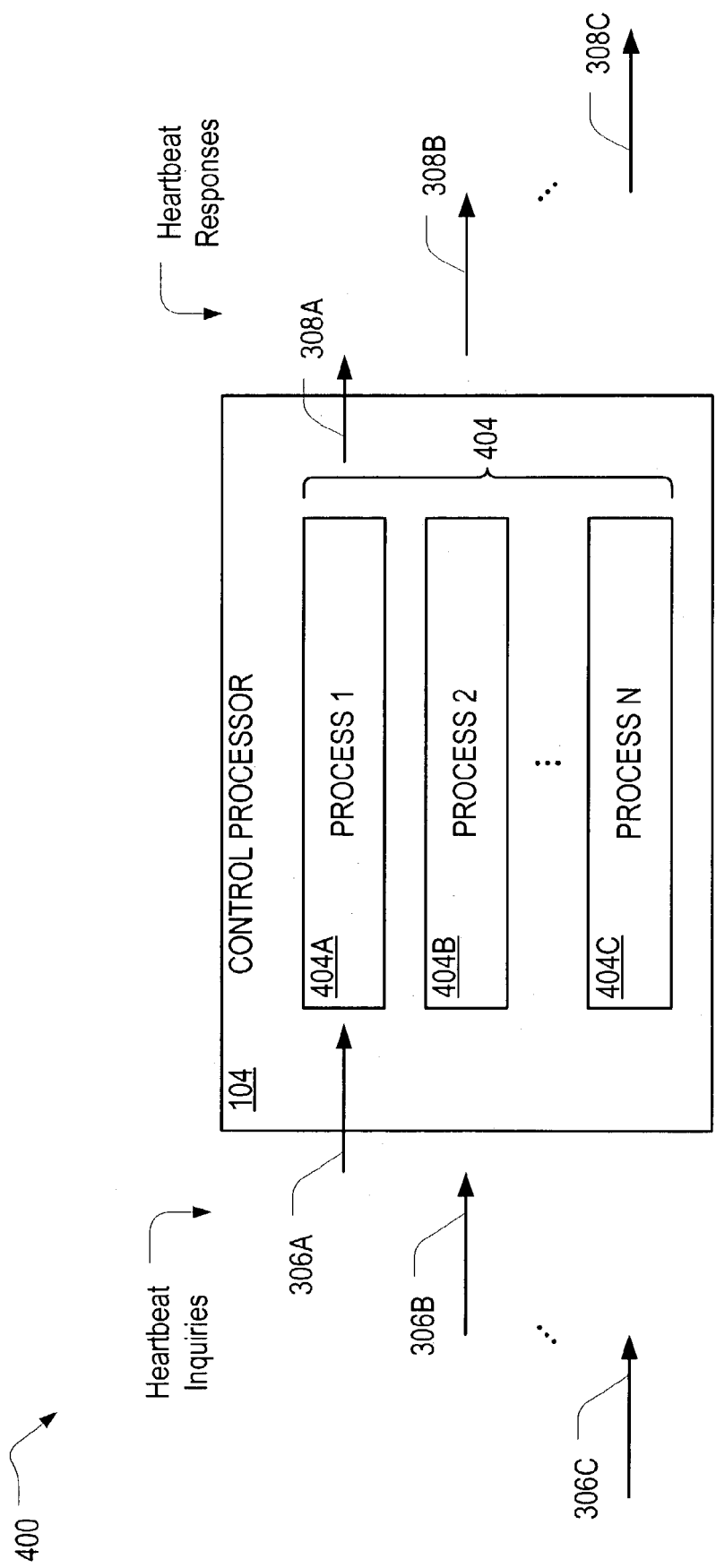
FIG. 4 is a block diagram of a control processor shown in FIG. 1.

The monitoring of a control processor to determine whether it is in-service is performed by monitoring critical software processes that it runs. The monitoring of an integrity of critical processes running on a control processor 104,106 is described with reference to FIGS. 3 and 4, and is performed by a heartbeat monitor 220. Integrity of a control processor is defined as being "in-service" or "out-of-service". The heartbeat monitor 220 includes tables of critical processes 304 that contain a list of selected processes 404 that run on the respective control processors 104,106. The tables are referenced by a heartbeat inquiry generator 306, which generates heartbeats 306A,306B,306C for respectively monitoring the integrity of process 404A, 404B and 404C running on the control processors 104,106. The heartbeat monitor 220 sequentially generates and transmits the heartbeat inquiries 306A,306B,306C to corresponding processes 404A,404B,404C (FIG. 4). If each process 404A, 404B,404C returns a heartbeat response 308A,308B,308C within a predetermined period of time, the integrity of each process is declared "in-service". If any of the processes 404A,404B,404C fails to return a heartbeat response 308A, 308B,308C within the predetermined period of time, the integrity of that process 404A,404B,404C and the processor 104,106 that runs it is declared to be "out-of-service".

The invention supports a hitless control processor reset and also supports hitless software upgrades, as long as the packet forwarding engine 214 on STCs 112 does not require reset.

It should further be understood that the assignment of routed interfaces is done at the physical or logical interface level. Therefore, given an STC 112, it is not necessary for all interfaces 224 to be mastered by the same control processor. It should also be noted that a mix of routed and stub routed interfaces to the STCs 112 is permissible.

All packet services run on both control processors 104, 106 at a steady state. This includes both unicast and multicast IP protocols, and all MPLS signaling protocols such as RSVP (reservation protocol) and LDP (label distribution protocol). In general, the control processors are unaware of each other. There are exceptions to this rule, however. First, all local interface (host) routes and subnet routes are injected into the IP forwarding table of both control processors. This exception applies to both UNI 119 and NNI 115 interfaces. Second, for services other than IP unicast, MPLS and RSVP (i.e. services that must be kept synchronized) software on each control processor 104,106 must be aware of its current state, being a master or a standby, and behaves accordingly.

At steady state, core-to-core traffic is routed between routed interfaces of the same control processor. Customer-to-core traffic may be distributed between routed interfaces of both control processors 104,106. Core-to-customer traffic is distributed on ingress between routed interfaces of both control processors. During a control processor reset or software upgrade, the STC 112 is notified that one of the control processors has become unavailable. The STC 112 updates all the logical interfaces to associate with the remaining control processor as the master, which effectively instructs the packet forwarding engine 214 to forward all traffic related to the forwarding table of the remaining active control processor. Note that logic of the packet forwarding engine 214 does not change, and theoretically there should be no packet loss as a result of control processor reset or software upgrade, as long as the packet forwarding engine 214 is not reset. When one control processor is unavailable, core-to-core traffic is routed from any routed interface to the routed interface of the remaining control processor. Customer-to-core traffic is routed towards a routed interface of the remaining control processor.

IP multicast forwarding tables are downloaded from the master control processor to the STCs 112. As there is only a single copy of the IP multicast forwarding table on the STC, no decision is required to select which table to use, as is the case with unicast traffic. During a control processor reset or software upgrade, the STCs 112 are notified that a control processor has become unavailable. Initially, the STC 112 will do nothing, but when one of the following two conditions is met, the FIB manager 230 on the STC 112 will erase all the original content of the forwarding information base. The first condition is met if a timeout has expired. The second condition is met if the new master control processor has re-learnt and distributed the same routes that the FIB manager 230 has already installed.

IP multicast continues to use the original routes when the master control processor becomes unavailable for a period of time, or after the same set of routes are re-learnt by the new master control processor. A network topology change during control processor switch-over potentially causes packet loss.

When a control processor 104 (for the purpose of the following discussion designated CPx) becomes unavailable due to a software crash, hardware fault, or for any other reason except a software upgrade (which is discussed below in some detail) all STCs 112 and the other control processor (designated CPy in this example) are notified. The packet forwarding engine 214 adjusts the control processor mastership of all affected interfaces to associate with the remaining control processor CPy. The packet forwarding engine 214 adjusts all UNI Layer 1 and Layer 2 physical and logical port records to associate with the remaining control processor. The packet forwarding engine 214 also adjusts a control processor selection algorithm for any Layer 3 static (stub) interface (either NNI or UNI). CPy operates as if nothing has happened. The CPy still advertises its own routes, along with all the local routes of the CPx.

Routing peers of CPx stop hearing from CPx for the duration of the reset. Take OSPF (open shortest path first) as an example, it will take 3 times a single hello time (30 seconds) to detect that CPx is unavailable. Normally, CPx will recover in much less than 30 seconds during a warm restart. Hence, any immediate network wide route flap is minimized. Of course, in the event of a persistent hardware or software failure, routing peers will eventually detect the problem and route around all of the routed interfaces of CPx. After CPx recovers, all routing protocol stacks on CPx restart. CPx then re-establishes peering with its original routing peers. Route flap will occur during this stage for a short period of time. CPx then continues to converge and update its forwarding information bases table on STCs 112.

After a predefined period of time, STCs 112 are notified that the CPx forwarding tables are now ready to be used. The packet forwarding engine 214, control processor mastership of all applicable interfaces, and control processor selection algorithm are reset to their original configuration. The delayed notification of CPx availability to STC 112 is intended to minimize routing loops in the carrier core network while CPx is converging.

Assumptions relevant to the control processor reset discussion above include: 1) The STCs 112 rely on at least one control processor being operational; and 2) Logical interface configuration and operational status are propagated to both control processors 104,106, regardless of control processor mastership of the related interface.

A discussion of how software upgrades are conducted is also relevant to the operation and maintenance of the apparatus in accordance with the invention. One way of upgrading a general purpose CPU software load requires an upgrade of software on the CP 104,106 as well as on STC 112. Note that other options for performing software upgrades may exist without departing from the scope of the present invention. Further, although network processor software upgrades may be impacted, they are not described.

The invention provides a method of performing hitless software upgrades. For example, if a control processor 104 (CPx) is to be upgraded, the CPx is taken out-of-service, but CPy 106 and STC 112 behave exactly as they do in the CP reset scenario described above. The CPx is then reloaded with the new software load and starts running after a reboot. From the perspective of the CPx, all interfaces are down, even though they are still forwarding ingress traffic using CPy's forwarding information bases.

Each STC 112 is respectively reloaded with the new software version, and restarted. The packet forwarding engine 214 is still forwarding traffic based on CPy's forwarding table. While the STC CPUs are restarting, local services such as loopback detection and MAC address learning are unavailable.

Following reboot after the new software load, CPx enables its interfaces and establishes peering with neighboring routers. The CPx then downloads its forwarding information bases to the STCs 112. After a predefined period of time, the STCs 112 switch back to using forwarding information bases of the CPx. CPy is subsequently reloaded with the new software version and reboots to start running. CPy then establishes peering with neighboring routers. CPy downloads its forwarding information bases to STCs 112. After running protocol convergence and sanity checks, the STCs 112 switch to using the FIB of CPx, and the software upgrade is complete.

The invention also provides a method for ensuring failover protection for a connection through the high-availability router 102. When the connection is established, routed interfaces are created for both a primary and a backup control processor (CPx, CPy). The routed interfaces are mastered by respective CPs, so that the respective routed interfaces are not mastered by the same CP. The CP that masters the primary interface requests bandwidth for the primary routed interface from the bandwidth manager 240 on a link to the next router in the network path, such as a label switched path (LSP). This same reserved bandwidth is also associated with the backup interface.

In order to facilitate failover recovery, and to associate the backup interface with the reserved bandwidth, an identifier of the network connection is included in packets that are sent over the network path. In the event of a failover, a packet forwarding engine of the STC 112 receiving the packets will be switched to access only the forwarding information base (FIB) of the CP that is active, The identifier is inserted into packets sent through the network connection, so that the bandwidth reserved for the connection is used in the event of the failover.

Implementation of a virtual local area network (VLAN) can be used for this purpose, for example. A VLAN is set up over the link(s) that are reserved for the connection, at connection time, as is a backup VLAN that is associated with the FIB associated with the backup interface. Both VLANs are associated with the same reserved bandwidth, and are defined substantially identically. When packets containing the VLAN tags are received at the high-availability router 102, they are inspected by the packet forwarding engine 214, which uses the VLAN tags to determine the routed interface to which the packet is to be directed, in order to route the data over the reserved bandwidth. If the CP that masters the primary routed interface is not available, the associated FIB will not be accessible, and the identifier will be translated by the packet forwarding engine 214, which uses a translation table associated with the FIB maintained by the CP mastering the backup routed interface, to associate the identifier with the backup interface. The lookup table is used to forward the packets over the reserved bandwidth associated with the backup VLAN.

The identifier may be stored in any part of the packet inspected by the packet forwarding engine 214 that is suitable for the task, such as, for example, inner tags of an MPLS packet.

Figure 5:
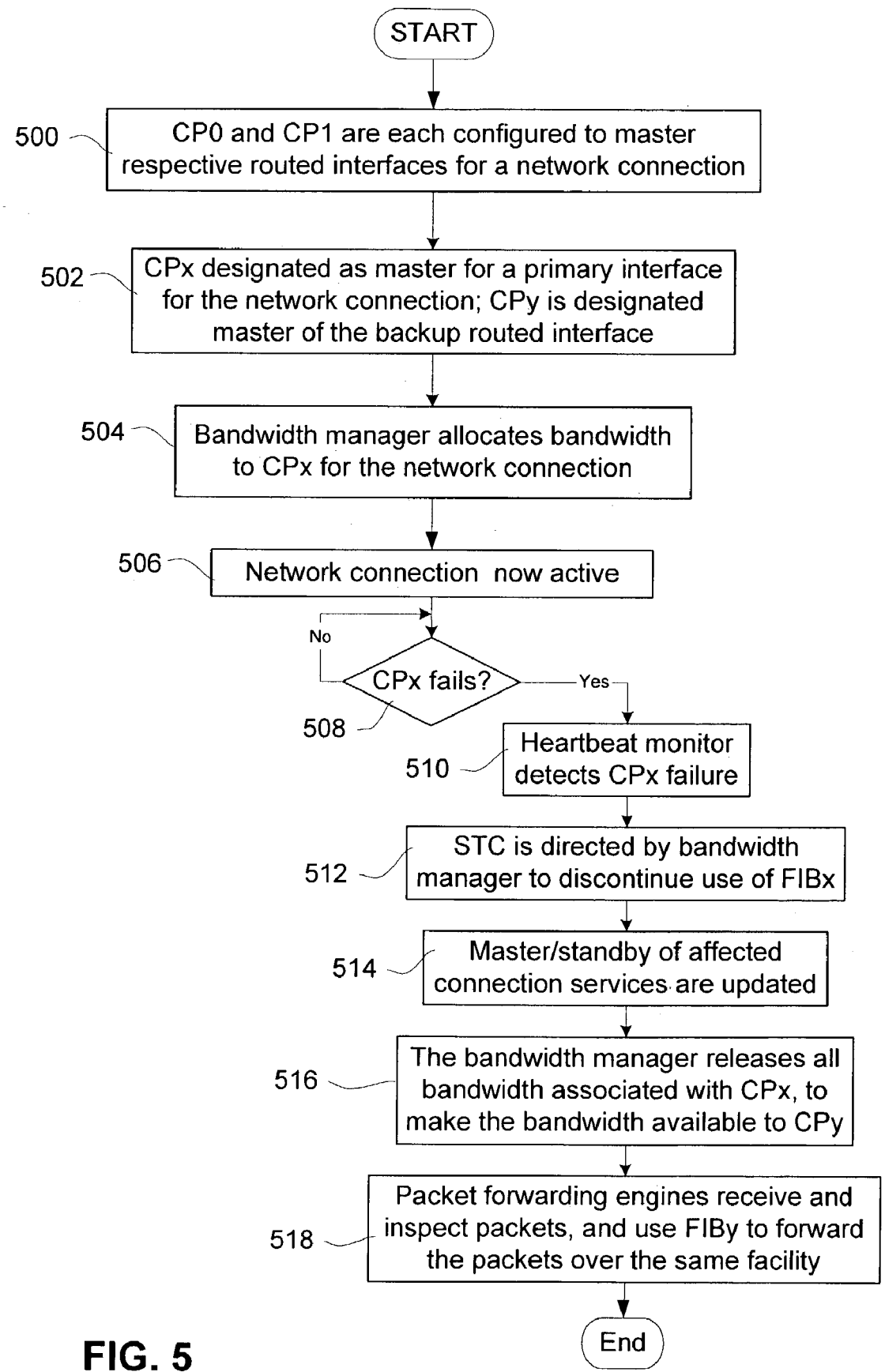
FIG. 5 is a flowchart illustrating a protection scheme for protecting against failure of one control processor in a high-availability router, without requiring reservation of additional bandwidth resources.

FIG. 5 is a flowchart illustrating the method of failover protection in accordance with the invention for protecting against failure of one control processor in a high-availability router, without requiring reservation of duplicate bandwidth resources for a backup path. The method of failover protection using a high-availability router in accordance with the invention includes an initial phase of creating routed interfaces to support the connection through the high-availability router, a normal operations phase during which data is transferred through the connection, and, if the CP maintaining the FIB that supports the primary interface fails, a recovery phase in which the transfer of packets through the connection is resumed.

As will be understood by those of skill in the art, the provisioning of network connections may be performed in response to direct requests from traffic sources, or in response to traffic flow, network management, or other operations and managements (OAM) criteria. As shown in FIG. 5, in step 500, routed interfaces are created to support a network connection by updating respective routing tables to specify handling of packets associated with the network connection. In step 502, one of the two routed interfaces (that mastered by CPx) is selected as the primary interface for the network connection. The other routed interface (that mastered by CPy) serves as a backup interface that is used for the connection in the event that CPx becomes disabled. CPx is designated the master of the connection by modifying the control processor selection algorithm. The provisioning of these routed interfaces involves updating associated FIBs. This is preferably accomplished by providing a translation table for translating the identifier associated with the connection. The identifier may be a label, a tag, or other value stored in a portion of the packets inspected by the packet forwarding engine 214 that accesses the FIB.

The CPy is provisioned to support the connection using exactly the same bandwidth reservation. This may be accomplished, for example, by setting up primary and backup VLANs over the same facility (link having reserved bandwidth), in which case VLAN tags are used as the identifier. The translation table can be used to provide both routing information, and respective replacement VLAN tags that are inserted into an overhead portion of received packets prior to forwarding. The VLAN tags serve to identify the packets as ones associated with the VLAN extended over the reserved facility. Both the primary and backup VLANs are extended over the same facility, and are identical in regards to all characteristics of VLANs so that nothing is changed in the handling of packets in the event of failover from CPx to CPy.

In step 504, the bandwidth manager 240 (FIG. 2) allocates bandwidth to CPx for the network connection. The connection through the high-availability router 102 is now active (step 506), and packets can be transferred through the routed interface. The connection persists until the provisioning of connections changes, or, in step 508, the CPx fails. If CPx fails, the failure is detected by the heartbeat monitor 220 (step 510). The bandwidth manager 240 is informed immediately, and the STCs 112 of the router 102 (including the STC 112 that supports the network connection) are, consequently directed to discontinue use of FIBx (step 512). FIBx therefore becomes inaccessible. In step 514, the backup interface is designated the primary interface, and FIBy becomes accessible. A translation table associated with FIBy and maintained by CPy, which masters the backup routed interface, is updated to associate the identifier with the backup interface.

Now packets sent over the network connection can be handled correctly by the packet forwarding engines 214 receiving them, because FIBy routes the packets to the backup routed interface associated with respective identifiers. Concerns about the short term handling of packets, and the quality-of-service associated with the network connection, are therefore overcome, because a hitless failover in the event of control processor failure is provided. It is desirable, however, that the bandwidth manager 240 advises CPy of the release of all of the bandwidth allocated to CPx, to permit the CPy to request use of this bandwidth. The release and reallocation of bandwidth performed in step 516, may be accomplished while the forwarding of packets is ongoing (step 518).

The invention therefore provides an apparatus and method for high-availability packet processing that permits hitless software upgrades and hitless software and hardware fault failover.

While the preferred embodiments of the invention were described in specific terms, it should be noted that alternative network structures can be similarly utilized within the inventive concepts without straying from the intended scope of the invention. Persons skilled in the art will appreciate that there are other alternative implementations and modifications for implementing the present invention, and that the above implementation is only an illustration of one embodiment of the invention. Accordingly, the scope of the invention is intended only to be limited by the claims included herein.

We claim:

1. An apparatus for providing high-availability packet forwarding, with protection paths over the same facility without reserving duplicate bandwidth for the protection path, comprising:

a service termination card having a packet forwarding engine for receiving and forwarding packets in accordance with a forwarding information base;

a first control processor running a plurality of processes and communicatively coupled to the service termination card, the first control processor being designated master of a routed interface for a network connection and allocated bandwidth for the network connection;

a second control processor running, asynchronously with respect to the first control processor, a plurality of processes and communicatively coupled to the service termination card, the second control processor being designated master of a backup routed interface for the network connection and allocated the same bandwidth for the network connection;

a first forwarding information base (FIB) on the service termination card having forwarding information maintained by the first control processor;

a second forwarding information base on the service termination card having forwarding information maintained by the second control processor;

means for the packet forwarding engine to forward packets associated with the network connection in accordance with the first forwarding information base unless an integrity of the processes running on the first control processor is lost, and for forwarding the packets associated with the network connection using the second forwarding information base and the same bandwidth if an integrity of processes running on the first control processor is lost;

means for identifying the allocated bandwidth associated with the connection, using an identifier of the network connection carried in a predetermined field of packets being conveyed over the network connection, if the primary interface becomes unavailable; and a forwarding information base (FIB) manager that receives FIB information from the first and second control processors and stores the FIB information in a memory of the service termination card;

wherein the FIB manager stores primary and backup label switched paths (LSPs) in each of the first and second FIBs so that the primary LSPs in the first FIB are created and maintained by the first control processor and the backup LSPs in the first FIB are created and maintained by the second control processor, while the FIB manager stores the primary and secondary LSPs in a reverse order in the second FIB, to provide line protection as well as control processor fault protection for label switched paths.

2. The apparatus as claimed in claim 1 wherein the first and second forwarding information bases on the service termination card respectively comprise an Internet protocol forwarding information base.

3. The apparatus as claimed in claim 1 wherein the first and second forwarding information bases on the service termination card respectively comprise a multi-protocol label switching forwarding information base.

4. The apparatus as claimed in claim 1 further comprising a bandwidth manager for controlling reservation of local input/output bandwidth between the first and second control processors, the bandwidth manager being adapted to release bandwidth assigned to the network connection on a loss of integrity in the first control processor, and to re-assign the bandwidth to the second control processor when the second forwarding information base is used to forward the packets associated with the network connection.

5. The apparatus as claimed in claim 4 wherein the bandwidth manager is communicatively connected to a heart beat monitor that monitors an integrity of process running on the first and second control processes, and informs the bandwidth manager if one of the control processors is declared out-of service.

6. An apparatus for providing high-availability packet forwarding, with protection paths over the same facility without reserving duplicate bandwidth for the protection path, comprising:

a service termination card having a packet forwarding engine for receiving and forwarding packets in accordance with a forwarding information base;

a first control processor running a plurality of processes and communicatively coupled to the service termination card, the first control processor being designated master of a routed interface for a network connection and allocated bandwidth for the network connection;

a second control processor running, asynchronously with respect to the first control processor, a plurality of processes and communicatively coupled to the service termination card, the second control processor being designated master of a backup routed interface for the network connection and allocated the same bandwidth for the network connection;

a first forwarding information base (FIB) on the service termination card having forwarding information maintained by the first control processor;

a second forwarding information base on the service termination card having forwarding information maintained by the second control processor;

means for the packet forwarding engine to forward packets associated with the network connection in accordance with the first forwarding information base unless an integrity of the processes running on the first control processor is lost, and for forwarding the packets associated with the network connection using the second forwarding information base and the same bandwidth if an integrity of processes running on the first control processor is lost; and means for identifying the allocated bandwidth associated with the connection, using an identifier of the network connection carried in a predetermined field of packets being conveyed over the network connection, if the primary interface becomes unavailable;

wherein the first and second control processors are respectively adapted to advertise all local interfaces, so that reachability is maintained in a core network in an event that one of the control processors loses integrity.

* * * * *